United States Patent
Neumann et al.

(10) Patent No.: US 6,735,592 B1
(45) Date of Patent: May 11, 2004

(54) SYSTEM, METHOD, AND COMPUTER PROGRAM PRODUCT FOR A NETWORK-BASED CONTENT EXCHANGE SYSTEM

(75) Inventors: Seth Neumann, Mountain View, CA (US); Steve Obsitnik, San Francisco, CA (US); Greg Whittemore, San Jose, CA (US)

(73) Assignee: Discern Communications, Menlo Park, CA (US)

(*) Notice: Subject to any disclaimer, the term of this patent is extended or adjusted under 35 U.S.C. 154(b) by 302 days.

(21) Appl. No.: 09/713,520

(22) Filed: Nov. 16, 2000

(51) Int. Cl.[7] .............................................. G06F 17/30
(52) U.S. Cl. ........................... 707/101; 707/102; 707/3; 709/206
(58) Field of Search ................................. 707/101, 522, 707/3, 4, 5, 9, 10; 709/218, 104, 206, 102; 705/44

(56) References Cited

U.S. PATENT DOCUMENTS

| | | | |
|---|---|---|---|
| 5,774,859 A | 6/1998 | Houser et al. ............... 704/275 |
| 5,774,860 A | 6/1998 | Bayya et al. ................ 704/275 |
| 5,842,163 A | 11/1998 | Weintraub ................... 704/240 |
| 5,873,062 A | 2/1999 | Hansen et al. .............. 704/254 |
| 5,901,287 A | 5/1999 | Bull et al. ............. 395/200.48 |
| 5,903,882 A | * 5/1999 | Asay et al. .................... 705/44 |
| 5,933,822 A | 8/1999 | Braden-Harder et al. ....... 707/5 |
| 5,960,399 A | 9/1999 | Barclay et al. ............. 704/270 |
| 5,991,721 A | 11/1999 | Asano et al. ............... 704/257 |
| 5,995,943 A | 11/1999 | Bull et al. .................... 705/14 |
| 5,996,007 A | * 11/1999 | Klug et al. .................. 709/218 |
| 6,052,439 A | 4/2000 | Gerszberg et al. ........ 379/88.01 |
| 6,073,102 A | 6/2000 | Block .......................... 704/275 |
| 6,078,924 A | * 6/2000 | Ainsbury et al. ........... 707/101 |
| 6,081,774 A | 6/2000 | de Hita et al. .................. 704/9 |
| 6,094,649 A | 7/2000 | Bowen et al. .................. 707/3 |
| 6,101,468 A | 8/2000 | Gould et al. ................ 704/251 |
| 6,105,023 A | 8/2000 | Callan ........................... 707/5 |
| 6,199,082 B1 | * 3/2001 | Ferrel et al. ................ 707/522 |
| 6,430,602 B1 | * 8/2002 | Kay et al. ..................... 707/10 |

* cited by examiner

*Primary Examiner*—Charles Rones
*Assistant Examiner*—Hassan Mahmoudi
(74) *Attorney, Agent, or Firm*—Moser, Patterson & Sheridan, LLP.; Kin-Wah Tong, Esq.

(57) ABSTRACT

A system, method and computer program product are provided for providing a content exchange system. A request is received from a user utilizing a local system. A determination is made as to whether the user request can be fulfilled from information stored by the local system. The request is fulfilled from a local data source if the request can be fulfilled locally. If the request cannot be fulfilled locally, the request is fulfilled at a network site. A content directory connected to the network site is examined for selecting one or more network data sites having content potentially satisfying the request. The request is sent to the data site(s). Content pertaining to the request is received from the data site(s) and sent to the user.

21 Claims, 13 Drawing Sheets

SYSTEM, METHOD, AND COMPUTER PROGRAM PRODUCT FOR A NETWORK-BASED CONTENT EXCHANGE SYSTEM

FIELD OF THE INVENTION

The present invention relates to content retrieval and more particularly to a system for managing access to content.

BACKGROUND OF THE INVENTION

Researchers have pursued a variety of approaches to integrating natural language processing with document retrieval systems. The central idea in the prior art literature is that some, perhaps shallow variant of the kind of syntactic and semantic analysis performed by general-purpose natural language processing systems can provide information useful for improving the indexing, and thus the retrieval, of documents.

For more information regarding such research, additional reference may be made to the following documents:

Marti Hearst. 1992. Direction-Based Text Interpretation as an Information Access Refinement. In [Jacobs1992] (see below);

David Lewis. 1992. Text Representation for Intelligent Text Retrieval: A Classification-Oriented View. In [Jacobs1992] (see below);

Karen Sparck Jones. 1992. Assumptions and Issues in Text-Based Retrieval. In [Jacobs1992] (see below);

Paul Jacobs (ed.) 1992. Text-Based Intelligent Systems: Current Research and Practice in Information Extraction and Retrieval. Lawrence Erlbaum Associates, Hillsdale, N.J. New Jersey; and Christos Faloutsos and Douglas Oard. 1996. A Survey of Document retrieval and Filtering Methods. Technical Report, Information Filtering Project, University of Maryland, College Park, Md.

The general goal of a document retrieval system is to consult a large database of documents and return a subset of documents ordered by decreasing likelihood of being relevant to a particular topic. In a routing task, a document retrieval system returns a number of documents it judges most likely to be relevant to a query out of a database of a vast number of documents. A system performs well if a high proportion of the articles returned, high relative to the ratio of relevant articles in the corpus, are relevant to the topic, and if the relevant articles are ranked earlier in its ordering than the irrelevant ones. For more information regarding a typical document retrieval system, reference may be made to Donna Harman. 1996. Overview of the Fourth Text Retrieval Conference (TREC-4). In Proceedings of TREC-4.

The goal of an information extraction system, on the other hand, is to consult a corpus of documents, usually smaller than those involved in document retrieval tasks, and extract pre-specified items of information. Such a task might be defined, for instance, by specifying a template schema instances of which are to be filled automatically on the basis of a linguistic analysis of the texts in the corpus. For more information regarding a typical information extraction system, reference may be made to Ralph Grishman and Beth Sundheim. 1995. Design of the MUC-6 Evaluation. In Proceedings of the 6th Message Understanding Conference, ARPA, Columbia, Md.

Work in the areas of document retrieval and information extraction has seen some success in their separate, distinct domains. However, successful integration of the two to create an information indexing and retrieval system has yet to be demonstrated. There is therefore a need for improving such document/content retrieval and information extraction technology.

SUMMARY OF THE INVENTION

A system, method and computer program product provide a content exchange system. A natural language request (i.e., query) is received from a user utilizing a local system. A determination is made as to whether the user request can be fulfilled from information stored by the local system. The request is fulfilled from a local data source if the request can be fulfilled locally with information of the local system. If the request cannot be fulfilled locally, the request is fulfilled at a network site. A content directory connected to the network site is examined for selecting one or more network data sites having content potentially satisfying the request. The request is sent to the data site(s), which may be local or remote to the network site and can include websites, databases, etc. Content pertaining to the request is received from the data site(s) and sent to the user. As an option, details of the request, ultimate data sources, and intermediate processing can be logged for collecting a fee.

The present invention provides several methods that can be used to determine whether a query be handled locally. According to one method, the network site determines whether the user request can be fulfilled from information stored by the local system. According to another method, the local system sends content for fulfilling the request to the network site, where the results are compared and, optionally, ranked. The network site can also be used to determine whether the user request can be fulfilled from information stored by the local system.

In a preferred embodiment of the present invention, the content directory includes term frequency data, where the request is compared to the term frequency data for selecting the data site or site. Items of the content can be ranked according to relevance to the request.

In an embodiment of the present invention, the request is parsed for determining a meaning of the request. The determined meaning is used during examination of the content directory. In another embodiment of the present invention, a request is made for clarification information from the user. Such information is used to limit the responses.

Additional content can be pushed to the user. Such content can be selected based on user activity including the request. An example of such content is advertising. A cookie can be generated. Such a cookie can be used to record user preferences or avoid duplication of advertising.

The content for fulfilling the request can be filtered based on a transaction history of the user. Preferably, the user's requests and/or content selections (including the responses selected) are monitored to generate the transaction history.

DESCRIPTION OF THE PREFERRED EMBODIMENTS

Figure 1:
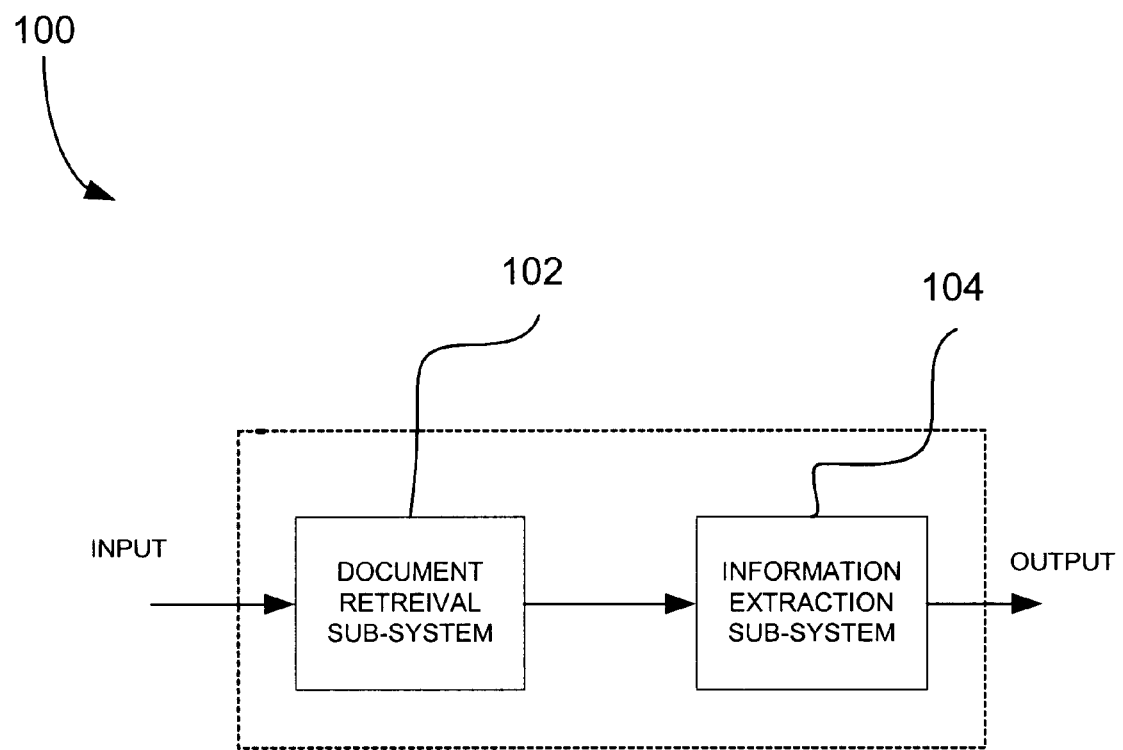
FIG. 1 illustrates a general schematic of the system in accordance with one embodiment of the present invention.

FIG. 1 illustrates a general schematic of the system 100 in accordance with one embodiment of the present invention. As shown, a document retrieval sub-system 102 is included for inspecting input in form of documents in a database, and a topic. In the present description, it is should be noted that documents may refer to any subdivision of information or data. In use, the document retrieval sub-system 102 is capable of outputting a subset of documents ordered by relevance, and can be ordered based on decreasing likelihood of being relevant to the particular topic.

The system 100 further includes an information extraction sub-system 104 which is capable of receiving the subset of documents from the document retrieval sub-system 102 for further processing. In particular, the information extraction sub-system 104 is adapted to consult the corpus of documents and extract prescribed items of information for refining the ranking process.

Figure 2:
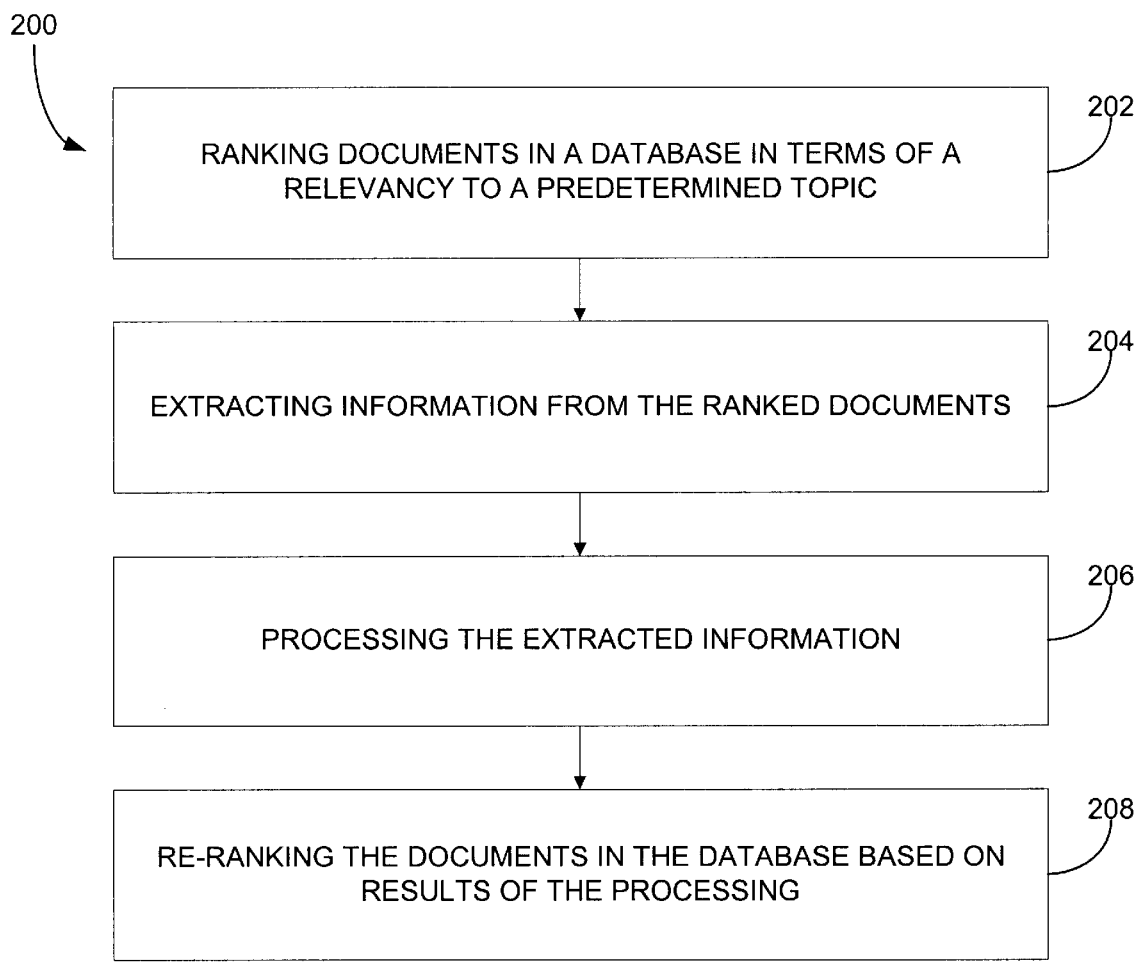
FIG. 2 is a flowchart showing a method for ranking documents in a database in accordance with one embodiment of the present invention.

FIG. 2 is a flowchart showing a method 200 for ranking documents (including a subset of documents selected from a larger group of documents) in a database in accordance with one embodiment of the present invention. Initially, documents in a database are ranked in terms of a relevancy to a predetermined topic. Note operation 202. In one embodiment, this may be carried out by the document retrieval sub-system 102 of FIG. 1.

Thereafter, in operation 204, information is extracted from the ranked documents. The extracted information is then processed. See operation 206. The documents in the database are subsequently re-ranked based on results of the processing, as indicated in operation 208. The foregoing operations may optionally be executed by the information extraction sub-system 104 of FIG. 1.

As an option, the pool of documents to be re-ranked may constitute only a fraction of the original documents. The number of documents may be reduced by using only a predetermined portion of the most relevant documents.

In one embodiment, the extracted information may include segments, or phrases, in the documents. Further, the processing may include comparing the segments with a predetermined set of patterns such as word phrases that are known to be associated with a particular topic. The results of the processing may include a sum of a plurality of scores that are assigned based on the comparison. Additional information relating to such scoring process and the various rules associated therewith will be set forth hereinafter in greater detail.

Another embodiment of the present invention provides for a gentle degradation in terms of precision. Those information bits for which there is a high confidence, such as those that linguists have specifically tried to capture through the combination rules, are simply returned. For those items for which there is less confidence, alternative linguistic analyses are provided for the user to choose from. There could be some ranking involved, but it is more useful for attempting to establish which event type the user is interested in—a response that will be much more than just a simple ranking based on term frequencies.

Other Preferred Embodiments

Figure 3:
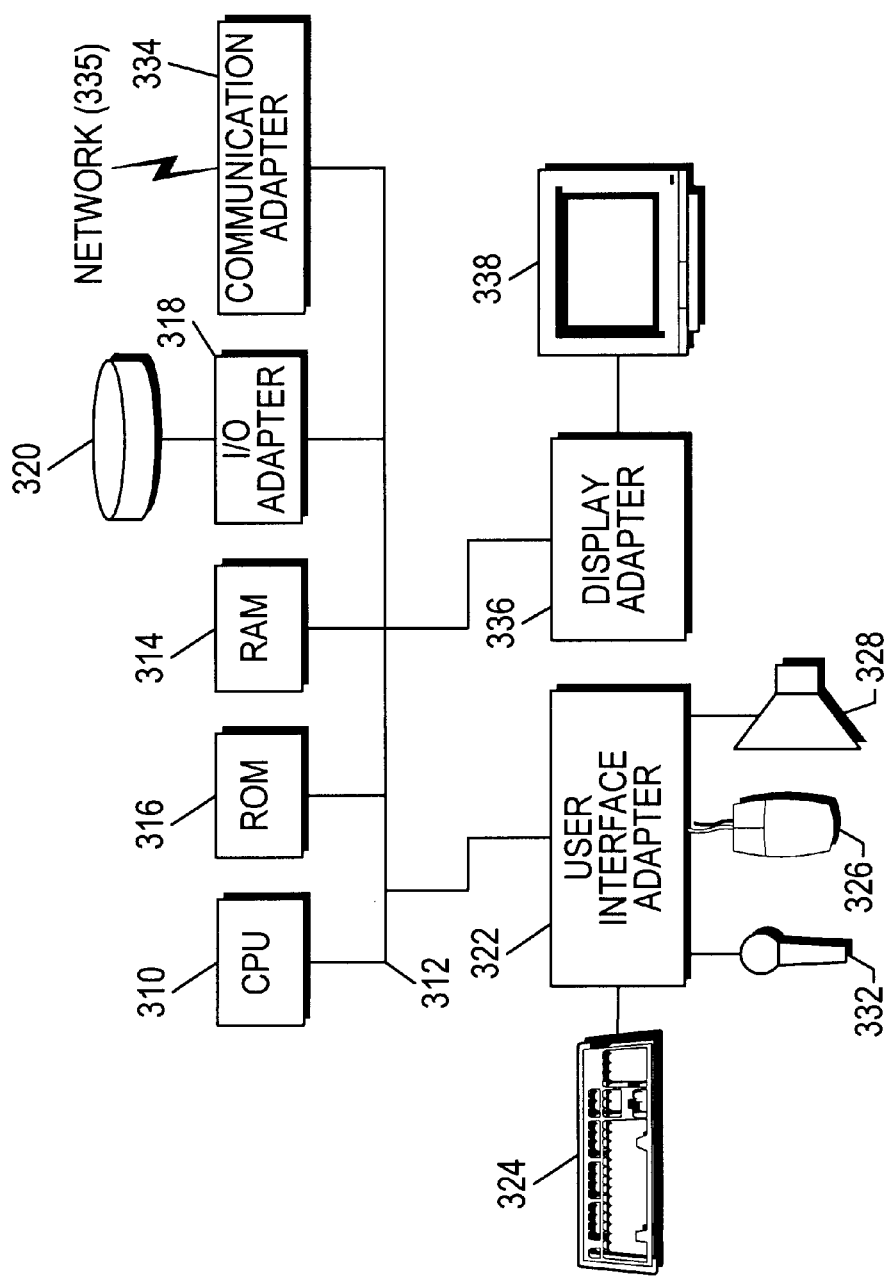
FIG. 3 shows a representative hardware environment in which the foregoing method of FIG. 2 may be carried out.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 3, which illustrates a typical hardware configuration of a workstation in accordance with a preferred embodiment having a central processing unit 310, such as a microprocessor, and a number of other units interconnected via a system bus 312. The workstation shown in FIG. 3 includes a Random Access Memory (RAM) 314, Read Only Memory (ROM) 316, an I/O adapter 318 for connecting peripheral devices such as disk storage units 320 to the bus 312, a user interface adapter 322 for connecting a keyboard 324, a mouse 326, a speaker 328, a microphone 332, and/or other user interface devices such as a touch screen (not shown) to the bus 312, communication adapter 334 for connecting the workstation to a communication network (e.g., a data processing network) and a display adapter 336 for connecting the bus 312 to a display device 338. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided. OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small-scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the system. HTTP or other protocols could be readily substituted for HTML without undue experimentation. Information on these products is available in T. Berners-Lee, D. Connoly, "RFC 1866: Hypertext Markup Language—2.0" (Nov. 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UD) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Exemplary Preferred Embodiment

One embodiment of the information extraction subsystem may be based on a cascade of finite-state transducers that compute the transformation of text from sequences of characters to domain templates. Each transducer (or "phase") in the present embodiment takes the output of the previous phase and maps it into structures that constitute the input to the next phase, or in the case of the final phase, that contain the domain template information that is the output of the extraction process. A typical application might employ various sequences of phases, although the number of transducers in different applications may vary. Table 1 illustrates a non-exhaustive list of transducers.

TABLE 1

1. Tokenizer. This phase accepts a stream of characters as input, and transforms it into a sequence of tokens.
2. Multiword Analyzer. This phase is generated automatically by the lexicon to recognize token sequences (like "because of") that are combined to form single lexical items.
3. Name Recognizer. This phase recognizes word sequences that can be unambiguously identified as names from their internal structure (like "ABC Corp." and "John Smith").
4. Parser. This phase constructs basic syntactic constituents of the language, consisting only of those that can be nearly unambiguously constructed from the input using finite-state rules (i.e., noun groups, verb groups, and particles).
5. Combiner. This phase produces larger constituents from the output of the parser when it can be done fairly reliably on the basis of local information. Examples are possessives, appositives, "of" prepositional phrases ("John Smith, 56, president of IBM's subsidiary"), coordination of same-type entities, and locative and temporal prepositional phrases.
6. Domain or Clause-Level Phase. The final phase recognizes the particular combinations of subjects, verbs, objects, prepositional phrases, and adjuncts that are necessary for correctly filling the templates for a given information extraction task.

The rules for each phase may be specified in a pattern language, such as "FAST-SPEC" available through SRI International. The rules take the form of regular productions that are translated automatically into finite-state machines by an optimizing compiler.

There are many good reasons for extending a separation between application-independent rules and application-specific instances to earlier phases of the present embodiment, in particular to the Parser and Combiner. Example 1 illustrates the various ways in which the simple predication pollute (x, body-of-water) might be expressed, and patterns automatically generated to parse.

EXAMPLE 1 full clauses in the Domain phase
"they polluted the stream"
"the reservoir has been contaminated"
complex noun phrases in the Combiner phase
"the contamination of the creek"
"the bay's pollution"
compound nouns in the Parser phase
"the water pollution"
"the polluted lake"

Table 2 illustrates the general pattern for the first of the two complex noun phrases of Example 1. In such phrases, the object of the "of" phrase is the object of the event expressed by the head of the noun phrase ("contamination").

TABLE 2

ComplexNP --> ({NP[??subj] | NP[??obj]} P[subcat=gen])
{V-ING[TRANS,??head] | NP[TRANS,??head]}
{ P["of"] NP[??obj] |
P["by"] NP[??subj] |
P[??prep1] NP[??pobj1] |
P[??prep2] NP[??pobj2] }*;
??semantics ;;

Table 3 sets forth a topic-specific instance of the pattern of Table 2.

TABLE 3

Instantiate
OfNP
??label = combiner-1-pollute
??subj = chemical
??head = pollute
??obj = body-of-water
??semantics = weight = (assign-weight ((subj && obj) 10000)| (obj 1000))
;;

The topic-specific instance of Table 3 can be thought of as a collection of macro definitions. During grammar-compilation, the "macro calls" in the patterns are expanded. In Table 3, the string "??subj" is replaced by "chemical"; "??head" by "pollute", and so on. The resulting instantiated pattern is shown in Table 4.

TABLE 4

ComplexNP --> ({NP[chemical] | NP[body-of-water]} P[subcat=gen])
{V-ING[TRANS, pollute] | NP[TRANS, pollute]}
{ P["of"] NP[body-of-water] |
P["by"] NP[chemical] }*;
weight = (assign-weight ((subj && obj) 10000)| (obj 1000));;

Items in square brackets of Table 4 represent constraints on the phrase. For instance, "stream", "river" and "reservoir" are all nouns with the lexical feature body-of-water and only noun phrases with such nouns as heads satisfy the constraints on noun phrases in the rule instance.

EXAMPLE 2

Grammar Writing Plus Probabilistic Models

Having extended the method of general rules and application-specific instances to the Parser and Combiner, the example focuses on the ability to write grammars for multiple topics. The topic associated with the present example includes: "Document will announce the appointment of a new CEO and/or the resignation of a CEO of a company." The foregoing topic was run in a database as an ad hoc query, producing a set of 1000 text documents it deemed most likely to be relevant, and ranking them in order from most likely relevant to least likely. Both the document set and the ordering served as inputs to information extraction sub-system.

In one embodiment, the information extraction sub-system may include FASTUS offered by SRI International. For more information on such system, reference may be made to: Doug Appelt, John Bear, Jerry Hobbs, David Israel, Megumi Kameyama, Andrew Kehler, Mark Stickel, and Mabry Tyson. 1995. SRI International's FASTUS System MUC-6 Test Results and Analysis. In Proceedings of the 6th Message Understanding Conference, ARPA, Columbia, Md.; and Doug Appelt, John Bear, Jerry Hobbs, David Israel, Megumi Kameyama, Mark Stickel, and Mabry Tyson. 1996. FASTUS: A Cascaded Finite-State Transducer for Extracting Information from Natural-Language Text. In Emmanuel Roche and Yves Schabes (eds.) Finite State Devices for Natural Language Processing. MIT Press, Cambridge, Mass., which are each incorporated herein by reference in their entirety. Further, it should be noted that the document retrieval sub-system may include SMART offered by GENERAL ELECTRIC.

Two different schemes were tried for using the information from the information extraction sub-system to reorder the input list. Both involved configuring the grammar to assign scores to phrases based on correlation of phrase type with relevance. In one scheme, scores were assigned to patterns manually, based on intuitions as to differential contributions to relevance judgments; in the second, a probabilistic model for the relevance of a document was inferred from a set of training data.

As a basis for the present experiment, 100 were picked articles from the middle of the ordered set that the document retrieval sub-system produced (in particular, articles ranked 401 through 500). The templates that the information extraction sub-system produced from those articles were examined to identify criteria for assigning a relevance rank to an article. The information extraction sub-system then assigned a numerical score from 0.1 to 1000 to the templates that it produced for a phrase. The manner in which this scoring is carried out is shown in Table 5.

TABLE 5

1. CEO + person name + company name → 1000
2. CEO + company name → 100
3. CEO + person name → 10
4. CEO + transition verb → 1
5. CEO + BE verb → 0.1

The score of a phrase was taken to be the sum of the scores of the templates created from that phrase; the scores from the phrases were summed to yield an article's score.

For a second experiment, it was asked how a system for automatically identifying features concerning the output of the information extraction sub-system would compare with the results obtained by the manually tuned system. This was accomplished by first determining the relative strengths of the features concerning the output of the information extraction sub-system. A probabilistic model for the relevance of a document was inferred from a set of training data.

In yet another experiment, a ranked list of 2,000 documents for each query were used. Grammars for 23 of the 47 topics were developed. For these 23 topics, the information extraction sub-system ran over the 2,000 articles, reordered them, and truncated the same to 1000. For the other 24 topics, the original ordering was truncated at 1000 documents. As in the first experiments set forth hereinabove, the reordering is achieved by having patterns, that is, instances (see example above), assign a score to the segment (phrase) of an article successfully matched against. An article's total score is the sum of the scores of all the patterns that matched against phrases in that article.

For each topic, a small number of relevant articles (10–15) were read, and a topic-specific grammar was constructed by writing instances of the kind exemplified above. The grammar was then run over some portion of the training data. Whenever a pattern matched a phrase, the phrase was recorded as being either a correct match or a false positive. Both sets of phrases were then reviewed to look at some of the relevant articles that were missed, and revise the grammar. After a small number of iterations of this kind, the grammar was declared done, and work was then started on the next topic.

The scores were assigned with a threshold score in mind. An article had to contain at least one pattern that had a score of 1000 or above to be moved toward the beginning of the ordering; scores below 1000 had no effect on the order and were used solely for diagnostics. There was one exception to this general rule. In one topic, the following mini-experiment was used: phrases were assigned maximum scores of 250, so that at least four matching phrases were needed to move an article to the front of the ranking. This was intended to handle cases where one could find no especially reliable phrasal indicators of relevance. Another way to put this is that this method is a crude approximation to a statistical approach based on co-occurrence data. When writing the grammars, the present approach was to aim for high precision and to sacrifice recall when in a position to make a precision/recall tradeoff.

Figure 4:
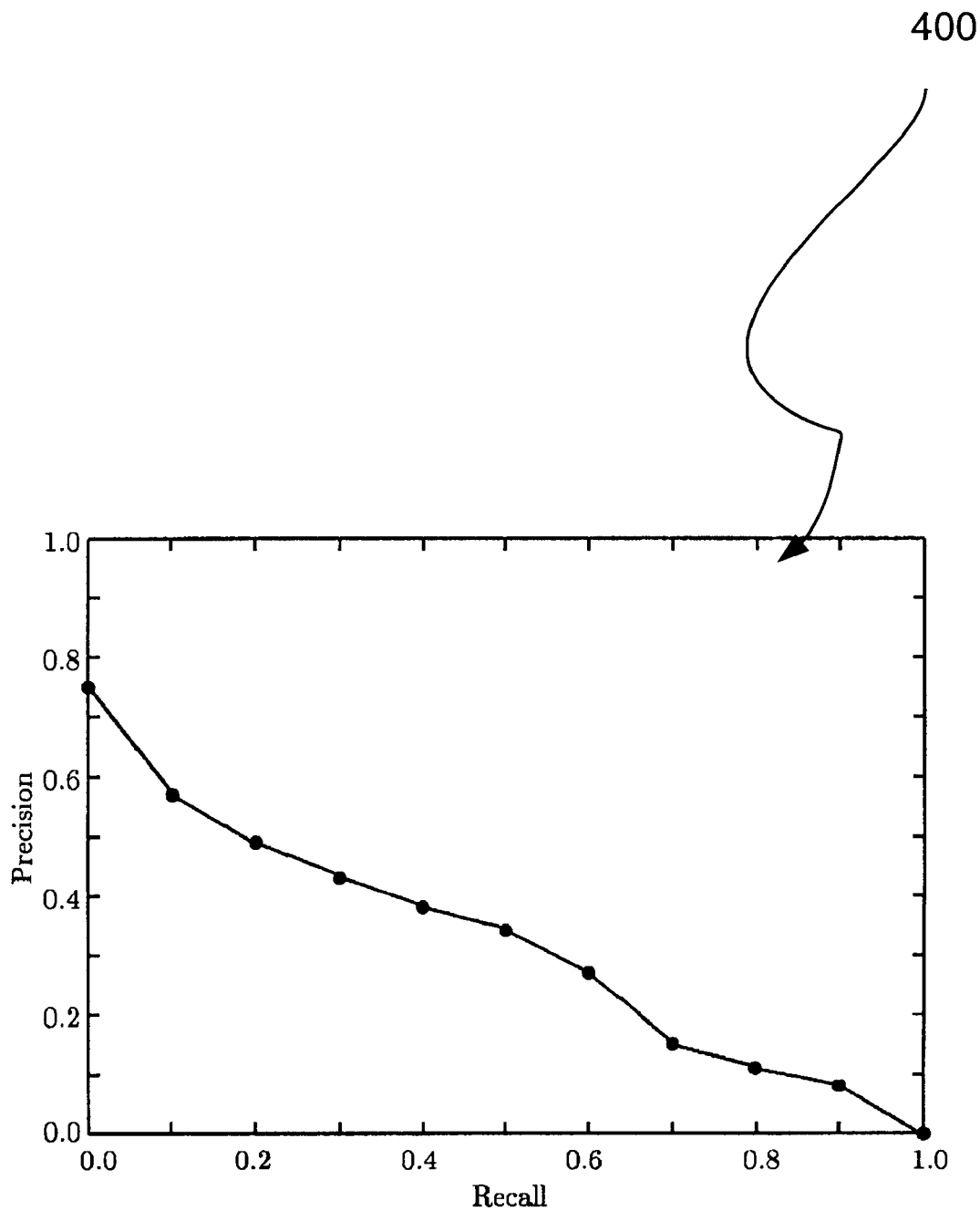
FIG. 4 illustrates a graph of precision versus recall for an exemplary experiment carried out in accordance with one embodiment of the present invention.

As noted above, grammars were written for 23 of the topics. FIG. 4 illustrates a graph 400 of precision versus recall for the 23 topics. The overall results of the combined system for average precision are: 12 topics above the median; 3 at the median; and 8 below the median.

Various guidelines may be followed during use of the present embodiment. Table 6 illustrates such guidelines.

TABLE 6

- There should be sufficient data, in particular, enough relevant articles,
  (i) to accumulate patterns for the initial grammar-writing exercise and
  (ii) to use as a training corpus for adding to and "debugging" those grammars.
- There should be fairly reliable indicators of relevance that are fully phrasal in structure.
- If relevant data is scarce in a given corpus, it is worth it to go out and look for more.
- In following a hybrid approach, it is important to use the output of the document retrieval system in training.

Content Exchange System

Figure 5:
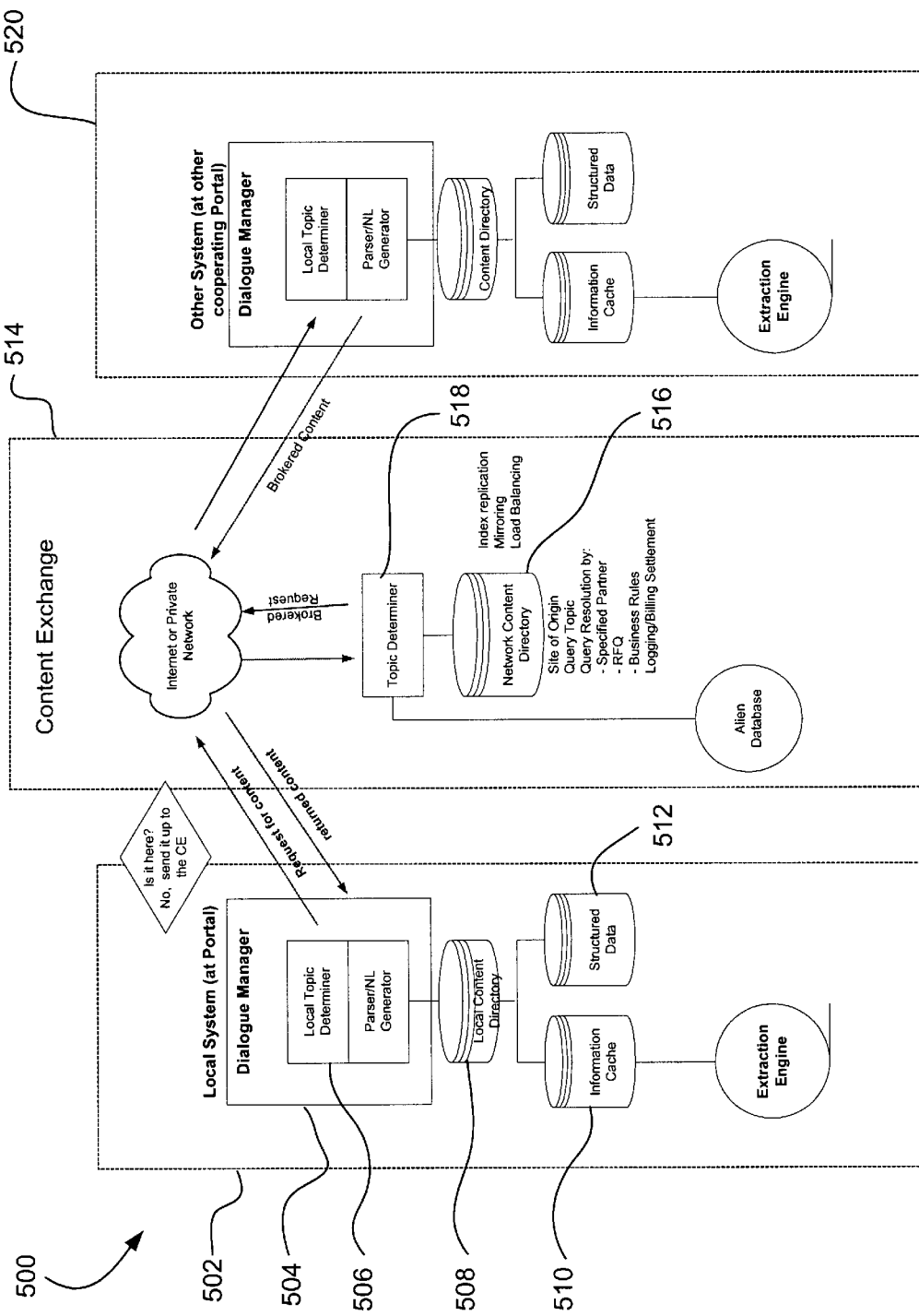
FIG. 5 illustrates a Content Exchange system according to an embodiment of the present invention.

FIG. 5 illustrates a Content Exchange (CE) system 500 according to an embodiment of the present invention. The system includes all participating local systems with their associated Dialogue Managers, Extraction Engines and local Information Caches, (and any local structured databases the Dialogue Managers can query). At its center is a networked content directory, which contains representations of the information holdings of the sites in the Network and which is used to handle requests from local systems for content from the network.

A user at a local System (portal) 502 makes a Natural Language request of the Dialog Manager 504 (at the local site). Following are four models that can be used to determine whether the query will be handled locally:

If the local Topic Determiner 506 determines that content is available locally (via result of the local query parser and content directory 508) the request is satisfied from the local NL Cache (Information Cache) 510 or local structured database(s) 512. See the section below entitled "Local Topic Determiner" for more information.

Alternatively, all requests can be sent directly to the Content Exchange 514 for determination of the appropriate cache, which might be the local cache 510 described in the previous paragraph.

The Local cache can start to answer the query while also forwarding it to the Content Exchange, which then compares all the results and ranks them.

As a final alternative, the most likely entries in the network content directory 516 could be replicated in the local content determiner so that the most likely queries that couldn't be handled locally can be sent directly to the cache most able to fulfill the request If the request cannot be satisfied locally, and the operator of the local system has chosen to subscribe to the Content Exchange, the request will be forwarded to the Content Exchange via the Internet, a private network, or other communications means.

The network topic determiner 518 takes the request and examines the network content directory and determines where (if at all) the content is available and routes via established rules on Site of Origin, Query Topic, Specified Partners or RFQ to the main Network, and other Business Rules. The network topic determiner can use one or more of the following algorithms, or others, to determine which local site to send the query to:

Standard information retrieval (IR) techniques such as Cosine Vector analysis, Poisson Distribution analysis, and "Term Frequency * Inverse Document Frequency" (TF*IDF) which would be run against the corpus associated with each site. These TF*IDF generated indices must be maintained for each participating site. The Content Exchange then broadcasts the query to all participating sites, which then return an indication of how likely their holdings are relevant to the query, or they can return the results if relevance is fairly high. In the former case, the CE routes the query back to the most relevant cache and then routes the answer back to the user. Or, the sites which determine that their content is very relevant to the query and return their answers to the CE, which then compares and ranks them.

Add weighting to TF*IDF to reflect syntactic structure and other NL features (smart TF*IDF), which would be run against the corpus associated with the site. Same considerations as above.

Perform a full parse on the query using NL parsing techniques to determine the exact meaning of the question and match the representation of that meaning against the content directory.

Add interactive dialogue to the Dialogue Manager, so that the local Dialogue Manager mediates an interaction where the Content Exchange can ask for clarification.

Build a taxonomy keyed to specific sites and compare terms in the query to the taxonomy.

The request is forwarded to the selected site 520 which returns content to the local site 502. The Content Exchange logs the transaction detail for settlement.

Figure 6:
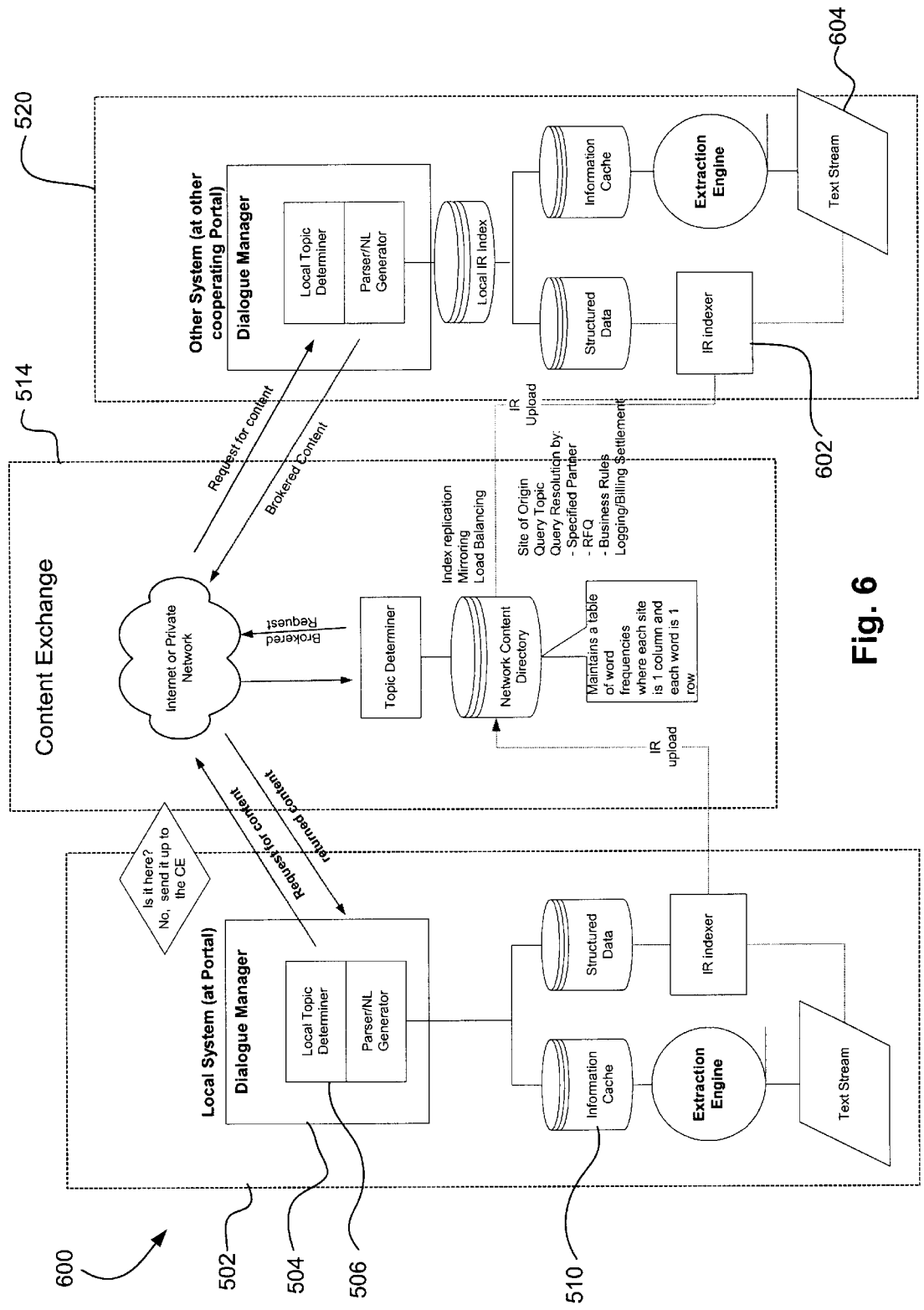
FIG. 6 illustrates an alternative embodiment of a Content Exchange system according to an embodiment of the present invention.

FIG. 6 describes an alternative embodiment 600 where each participating site is equipped with Information Retrieval (IR) Indexer 602. This embodiment is particularly useful for information retrieval on a text stream. The IR indexer at each site builds a word frequency table of the incoming text stream 604 and sends it to the Network Content Directory 516. In this model, the Network Content Directory is preferably a table with the significant words in the collected corpora as the rows and the sites as the columns (that is, the entire site appears as one column). A TF*IDF comparison is performed against the table and the original query is forwarded to the n most likely sites as above.

Figure 7:
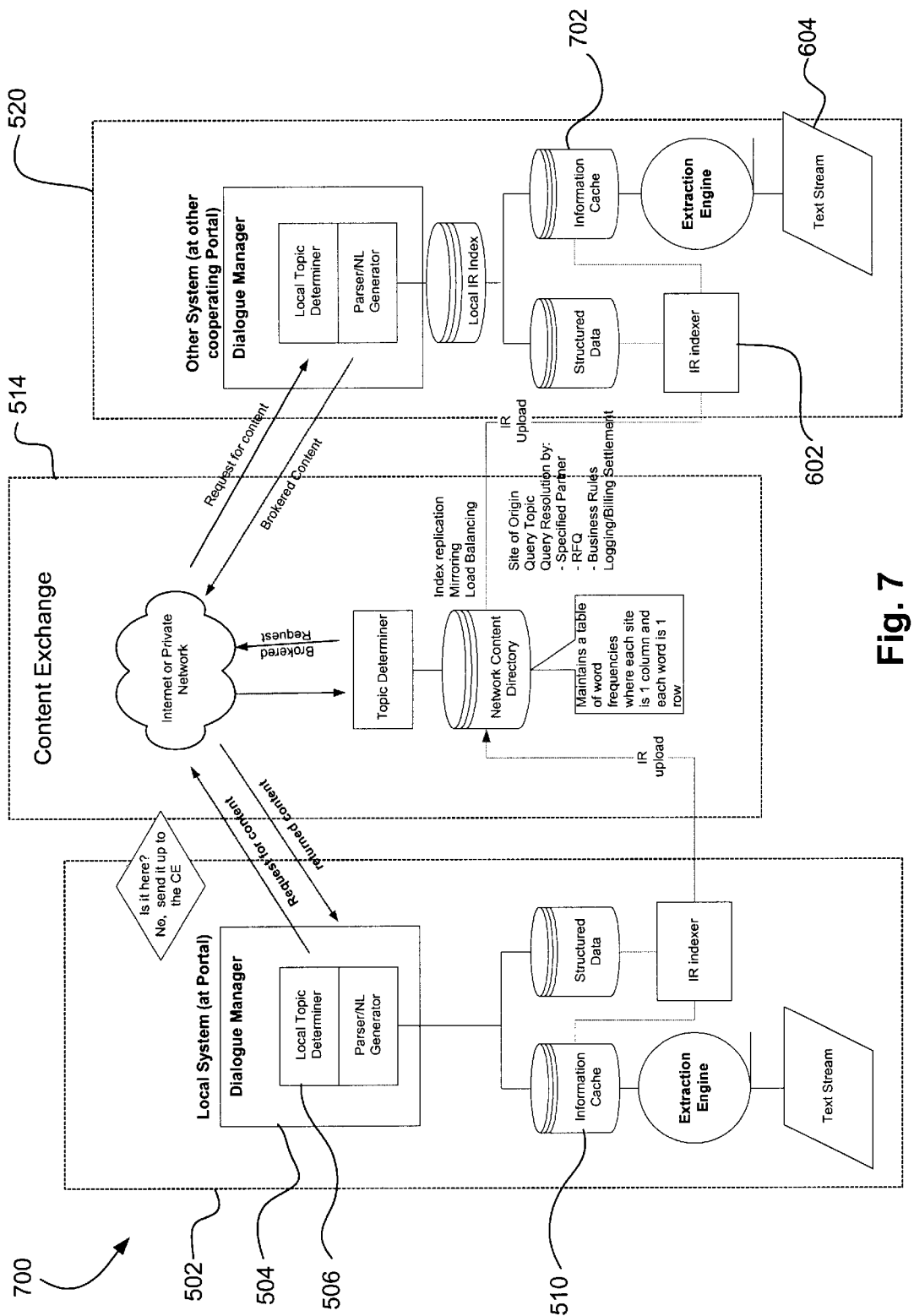
FIG. 7 illustrates another alternative embodiment of a Content Exchange system according to an embodiment of the present invention.

FIG. 7 depicts another alternative embodiment 700 where each participating site is equipped with Information Retrieval (IR) Indexer 602. This embodiment is particularly useful for information retrieval on cache and structured data. The IR indexer at each site builds a word frequency table of the local Cache 702 and sends it to the Network Content Directory 516. Otherwise this is similar to the scenario depicted in FIG. 6 and described above.

In any of the above embodiments, additional content can be pushed to the user. Such content can be selected based on user activity including the request. An example of such content is advertising. A cookie can also be generated. A cookie is information that a Web site puts on the user's hard disk so that it can remember something about the user at a later time. (More technically, it is information for future use that is stored by the server on the client side of a client/server communication.) Typically, a cookie records user preferences when using a particular site. Using the Web's Hypertext Transfer Protocol (HTTP), each request for a Web page is independent of all other requests. For this reason, the Web page server has no memory of what pages it has sent to a user previously or anything about your previous visits. A cookie is a mechanism that allows the server to store its own information about a user on the user's own computer.

The cookie may be used to pass the recent history of a user to another site if the rule is to forward the user. This may be used to personalize content for that user. Cookies can be used to rotate the banner ads that a site sends so that it doesn't keep sending the same ad as it already has sent. They can also be used to customize pages for a particular user based on the browser type or other information the user may have provided the Web site.

The content for fulfilling the request can be filtered based on a transaction history of the user. Preferably, the user's requests and/or content selections (including the responses selected) are monitored to generate the transaction history.

Before providing more detail about each of the components of the Content Exchange system, an exemplary embodiment will be set forth to provide a context of the operations of the Content Exchange system.

EXAMPLE 3

Figure 8:
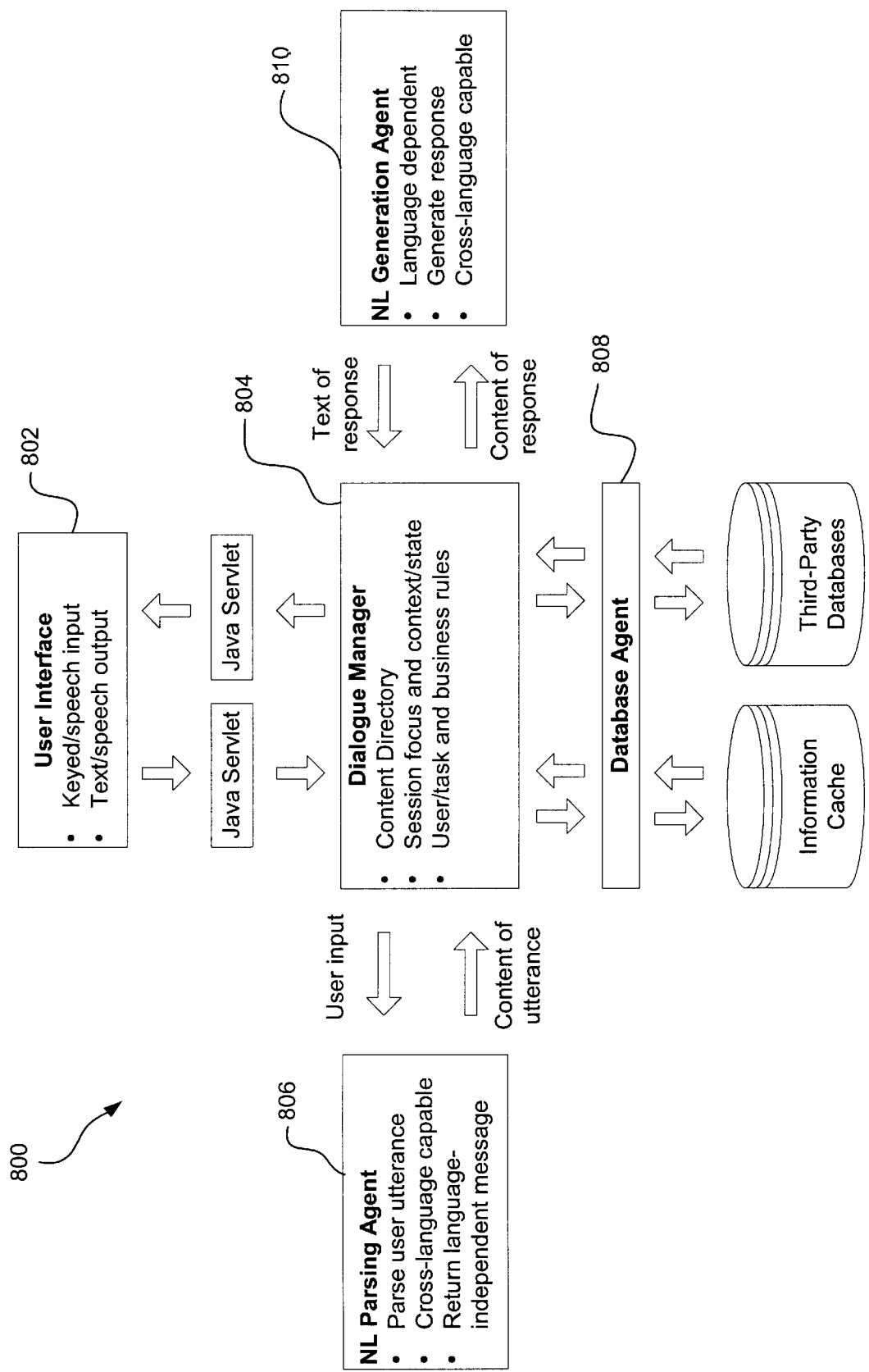
FIG. 8 depicts a content exchange system according to an illustrative embodiment of the present invention.

FIG. 8 depicts a content exchange system 800 according to an illustrative embodiment of the present invention. In this example, a Wine Wizard content exchange system is implemented as a community of four agents:

1. a User Interface (UI) agent 802, implemented as a Java™ Servlet that is run from a web browser;
2. a Dialog Manager (DM) agent 804, which interacts with the other agents and controls the dialog;
3. a Natural Language (NL) agent 806, which parses the user input; and p1 4. a Database (DB) agent 808, which provides domain information (mostly data about various wines) to the DM.

The agent interactions are defined using the Open Agent Architecture™ (OAA®) middleware, a product of SRI International's Artificial Intelligence Center (AIC). A description of the OAA is found below.

The DM receives a user's input from the UI and returns the system's response. Unlike many prior art dialog systems, the present invention allows for a mixed-initiative dialog, i.e., one where the user as well as the system can take the initiative in issuing directives or asking questions.

The system supports multimodal input, i.e., the user can input non-linguistic or linguistic information via typing, speech, menu selection, etc. As another example, is gesture input, such as in the case of a person sitting in front of the computer with a camera mounted on the terminal that monitors the user. In such a case, the user knows that he could just shrug and communicate that he is lost.

Suppose the user types or says "I am looking for a wine to buy for dinner tonight." When the "Submit" button on the UI is pushed, the UI agent sends the request for a response to the DM. The DM then asks the NL agent to parse the user input and return a logical form (LF). The NL agent identifies the language of the request, parses the request to generate a language independent LF, and returns the LF.

Upon receiving the LF, the DM translates it into an interpretation, taking the state of the dialog into account. The interpretation phase is accomplished using a form of recursive-descent parser to analyze the LF. First, the "parser" recognizes whether the LF represents a statement, a wh-question, a yn-question, a fragment, etc.; then delves more deeply into a structure to find out exactly what is being stated or asked. For fragments and utterances with pronouns, the dialog state—i.e., the context of the utterance—is examined to "fill in the blanks." For example, "okay" is taken to be an answer to the most recent system-asked yes/no question.

The ultimate result of the interpretation phase is a triple consisting of 1) positive constraints, 2) negative constraints, and 3) "other." This triple becomes the input to the response phase. First, however, the dialog frame—the part of the dialog state that represents the constraints—is updated with the information contained in the first two elements.

The response phase checks several distinct possibilities to determine the proper response. The first possibility is that the user has asked a question, e.g., "What vineyard does that wine come from?" (This information will be in the "other" slot of the interpretation.) The proper response in this case is to answer the question. This case also covers certain explicit dialog moves, such as accepting a recommendation. The second possibility is that the user has rejected a recommendation ("What else do you have?"). In that case, the proper response is to offer an alternate suggestion.

If neither of the above cases apply, the next step is to look for triggers in the interpretation. The new positive constraints are examined to see if they match a trigger rule. For example, if the user has indicated that he wants the wine for a dinner party, the system will immediately ask about the menu.

If no triggers apply, the DM checks whether it has enough information to make a specific recommendation. In the illustrative system, the necessary and sufficient conditions are that a price range and a wine variety are known. If this is not the case, the system defaults to asking a slot-filling question (e.g., "What's the occasion?", "What are you having for dinner?", "What is a maximum/minimum price?", etc.). An NL Generation agent 810 can be utilized to generate such questions for presentment to the user.

If the user responds "I am going to have chicken." to the question "What are you having for dinner?", the DM searches a local and/or third party knowledge base that maps kinds of foods to kinds of wines to ascertain a type of wine. If there are no more slot-filling questions to be asked, the system is out of options and must declare defeat or offer a general recommendation. However, this point can be reached only if the customer rejects multiple suggestions.

Finally, the DM selects the recommendation from an information cache and/or third party database and composes a response to the user's input, which is then returned to the UI. Preferably, the DM utilizes the NL Generation agent to generate a NL text or speech response in the user's native tongue.

As an option, after the response has been determined, the DM performs some necessary state maintenance tasks and then takes a snapshot of the dialog state. The snapshot is used by the system's "back up" feature, which permits a user to return to an earlier point in the dialog and continue from there. Finally, the DM collects all the requested state information and returns it to the UI along with the response information.

Open Agent Architecture™ (OAA®)

Open Agent Architecture is a software platform, developed by SRI International, that enables effective, dynamic collaboration among communities of distributed electronic agents. Very briefly, the functionality of each client agent is made available to the agent community through registration of the client agent's capabilities with a facilitator. A software "wrapper" essentially surrounds the underlying application program performing the services offered by each client. The common infrastructure for constructing agents is preferably supplied by an agent library. The agent library is preferably accessible in the runtime environment of several different programming languages. The agent library preferably minimizes the effort required to construct a new system and maximizes the ease with which legacy systems can be "wrapped" and made compatible with the agent-based architecture of the present invention. When invoked, a client agent makes a connection to a facilitator, which is known as its parent facilitator. Upon connection, an agent registers with its parent facilitator a specification of the capabilities and services it can provide, using a high-level, declarative Interagent Communication Language ("ICL") to express those capabilities. Tasks are presented to the facilitator in the form of ICL goal expressions. When a facilitator determines that the registered capabilities of one of its client agents will help satisfy a current goal or sub-goal thereof, the facilitator delegates that sub-goal to the client agent in the form of an ICL request. The client agent processes the request and returns answers or information to the facilitator. In processing a request, the client agent can use ICL to request services of other agents, or utilize other infrastructure services for collaborative work. The facilitator coordinates and integrates the results received from different client agents on various sub-goals, in order to satisfy the overall goal.

OAA provides a useful software platform for building systems that integrate spoken natural language as well as other user input modalities. Indeed, an advantage of OAA-based embodiments of the present invention, that will be apparent to practitioners in light of the above teachings and in light of the teachings disclosed in the cited co-pending patent applications, is the relative ease and flexibility with which additional service agents can be plugged into the existing platform, immediately enabling the facilitator to respond dynamically to spoken natural language requests for the corresponding services.

Dialog Manager 504 (See FIG. 5.)

According to a preferred embodiment of the present invention, the DM is a universal piece of software or hardware that performs various tasks such as managing a query entered into the system by a user. Because of its universality, it can be embedded into many types of applications for a variety of purposes, including electronic commerce.

As set forth above in Example 3, the DM interleaves several different types of knowledge:

1. Knowledge about a language being used, such as English, etc. The manager is able to recognize a language being used and configure itself appropriately to understand dialog, which often including dialects and slang words, in that language. Preferably, the manager is able to respond to the user in that language, either audibly or in natural language text.
2. Knowledge of the grammatical structure of the query dialog and the way people interact in dialog. This can also include knowledge about the way particular users speak and write.
3. Knowledge of the non-linguistic task and what agents/programs are involved in the task for which the query was made.
4. Knowledge of user interaction and presentation of information. The dialog manager knows how to present information to the user and knows what is on the screen that the user is interacting with. Multi-modal interfaces are supported, so that the user can see information on the screen and can point at it.
5. Knowledge about the user.

Preferably, the DM is language and dialect independent so that queries in any dialect of a language can be analyzed and satisfied, so long as the proper NL module (agent) is implemented. To achieve this functionality, natural language parsers and generation tools particular to various languages/dialects can be plugged into the dialog manager. First the language is typed, i.e., whether it is English, German, French, or other language, and then the parser determines a meaning of the request, preferably in light of the local dialect and/or slang terms. Modules for each language ensure that the proper context of the dialog can be determined.

The DM is preferably neutral as to domain and task and therefore works with any task, though it must have access to the domain from which it takes information for performing the task. Thus, for example, the same DM can handle all queries about wine, baseball, etc. The DM will determine what the task is and then determine the proper domain in which to seek information to complete the task.

In one embodiment of the present invention, the DM can be tuned for specific types of content or tasks. For example, the DM set forth above in Example 3 can be tuned to handle orders for wine. To tune the DM, the sources of knowledge that the DM needs knowledge about are plugged in to the DM, preferably in the form of task modules.

The DM can be tuned by integration with modularized software wrapped as a JAVA bean. The modularized software is preferably in the form of separate modules that represent knowledge based on forms. Each of the sources of programs has an agent wrapper and some protocol to obtain help on tuning the dialog manager for the particular information. An interaction communication language is utilized to allow the DM to query the correct agent (module) for information.

The tuning of the DM can be based on content in the business sense. Cross-selling and up-selling can be performed. For example, consistently popular items can be given priority as a result.

The DM can also be tuned for a particular person or type of person. The DM accesses a source of knowledge to retrieve a personality (or user) module containing user profile information to tailor itself. The system learns from task interaction with the user to log information in a relational database. An agent architecture can also be leveraged to identify characteristics of the user. The agents talk amongst themselves to gather information. Information can also be pulled from the billing system to determine characteristics of a user.

When tuning for a particular user, the personality module associated with the user is selected. Several methods that the DM can use to determine which personality module belongs to the user, including an explicit login by the user, cookies, tracking, etc.

The personality module will be used to tailor performance of tasks and results for the associated user. Thus, when two persons are doing/requesting a similar task, different results will be output. Further, the general traits of the user can be applied across domains. As an option, the same person can be dealt with at different levels based on the domain or content. For example, if the DM knows that the user is a software engineer, the level of detail when utilizing information from a technology site will be much more intense than when using information from a site about wine.

When tuning for different types of persons, such as a high schooler v. a $_6$th grader, personality modules are again used, except that the modules will apply general rules applied to all users of that type.

EXAMPLE 4

Figure 9:
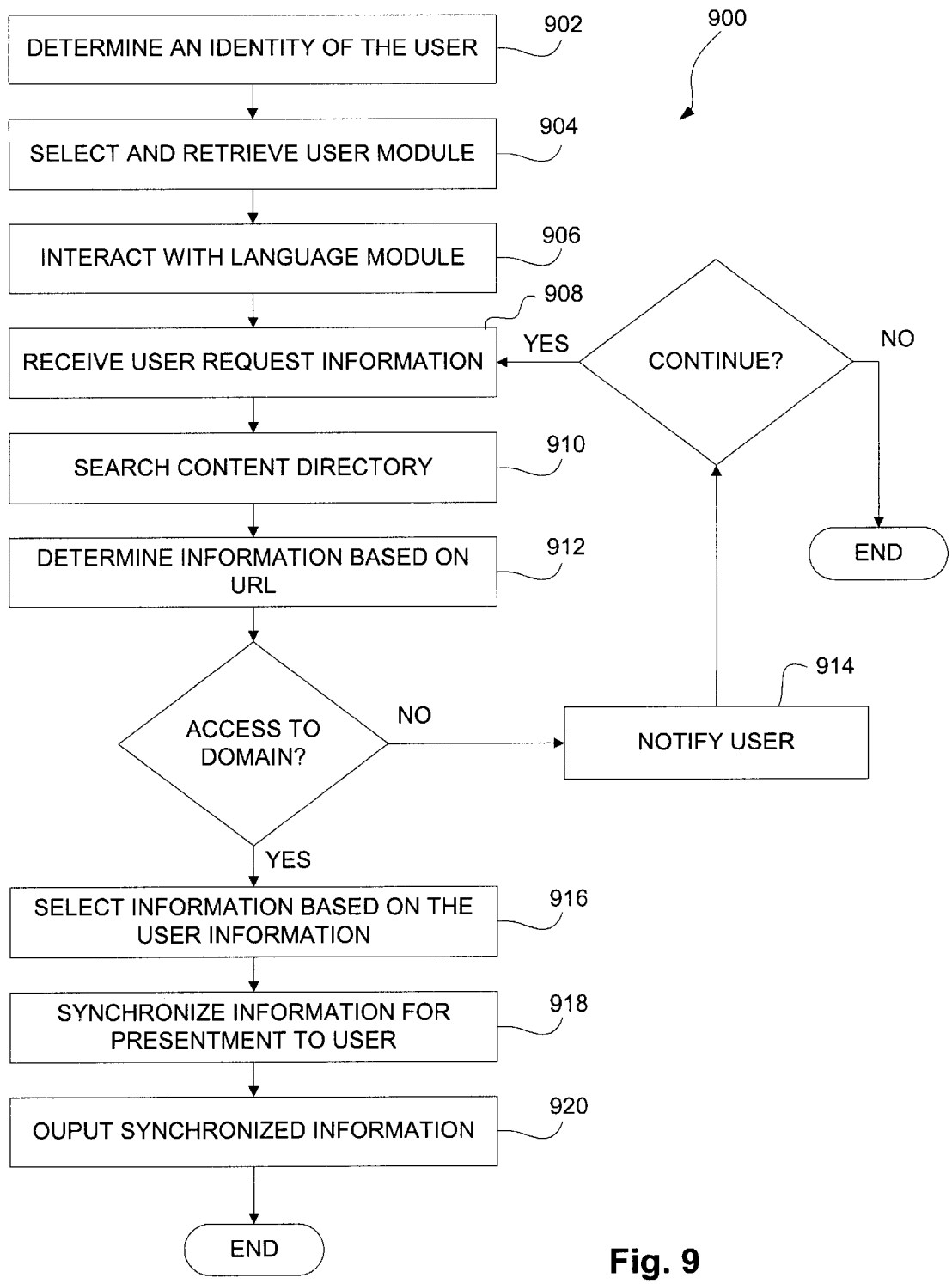
FIG. 9 illustrates a process for retrieving content according to an embodiment of the present invention.

FIG. 9 illustrates a process 900 for retrieving content according to an embodiment of the present invention. In operation 902, the DM determines the identity of a user based on the login information of a user logging on to the system. The DM selects the user module corresponding to the identity of the user in operation 904, and selects English (the user's preferred language) as the default language. In operation 906, the DM interacts with an English language module so that all communications with the user will be in English. If the DM determines that the user is from Northern California, the Northern California dialect can also be set as a default. The module having knowledge of the user posts a message to the dialog manager saying that the user is very good at leveraging resources and is intelligent.

The user requests information about automobiles, such as by selecting an "Autos" link. In operation 908, the DM receives a message from an application module that tells the DM that the user desires information about "automobiles." A search is made of a table of URL's v. content types in the content directory in operation 910.

To determine knowledge of the domain(s) and task(s), the DM determines information based on the URL in operation 912. In this example, assume the domain is a site for car buying. The DM asks the domain and task modules for information about "automobiles" and a type of task (buy, sell, price). If the DM doesn't have access to the information, it notifies the user of such in operation 914.

The particular instantiation of the DM will have information based on the specific application(s) or task(s). Whether different tasks are to be performed or if a single family of tasks can be inferred from the characteristics of the site.

In operation 916, the DM selects information based on the user information. Inside the DM is a model of the context. The DM should determine what is in focus, what is salient, etc. For example, while reviewing a site, the DM spots a flashing picture on the network data site. The DM recognizes the event (flashing picture) and takes action based thereon. The DM determines whether this is an event it should recognize, and if so, whether it should be sent to the user. The DM then tweaks the dialog with the user based on the event.

Representation of the content are generated and are independent of its language. The DM sends the string to a natural language parser to understand the language information. The parser sends back a representation of what was said. Then the DM determines what the user wants to see. If the user inputs an indicative sentence that states facts, such as "I want to see a Ferrari." The response is to show an image of the Ferrari. Which model to display can be determined based on various things, such as how much each model costs.

The DM synchronizes information for presentment to the user in operation 918. Clarification subdialogs can be submitted to the user to limit results if there are over a predetermined amount of answers.

In operation 920, the information is output. If the user is American, then the price is presented in dollars. If the user is French, then the price is in francs. By following a user path through the dialog, then the DM can dynamically infer information about the user and create a dialog that is well tuned to the user. The DM can respond to the user with pictures, animation, advertisements, etc. to help sell the user a particular automobile.

Possible responses that the DM can submit to the user include:

"Sorry I do not know, but . . . "

"I know the answer, which is . . . "

Output whatever the application allows.

Inside the DM is a model of the context. The DM should determine what is in focus, what is salient, etc. For example, while reviewing a site, the DM spots a flashing picture on the network data site. The DM recognizes the event (flashing picture) and takes action based thereon. The DM determines whether this is an event it should recognize, and if so, whether it should be sent to the user. The DM then tweaks the dialog with the user based on the event.

Representation of the content are generated and are independent of its language. The DM sends the string to a natural language parser to understand the language information. The parser sends back a representation of what was said. Then the DM determines what the user wants to see. If the user inputs an indicative sentence that states facts, such as "I want to see a Ferrari." The response is to show an image of the Ferrari.

Preferably, the state of the dialog manager is tracked by an ongoing data structure.

Local Topic Determiner 506 (See FIGS. 5–7.)

Figure 10:
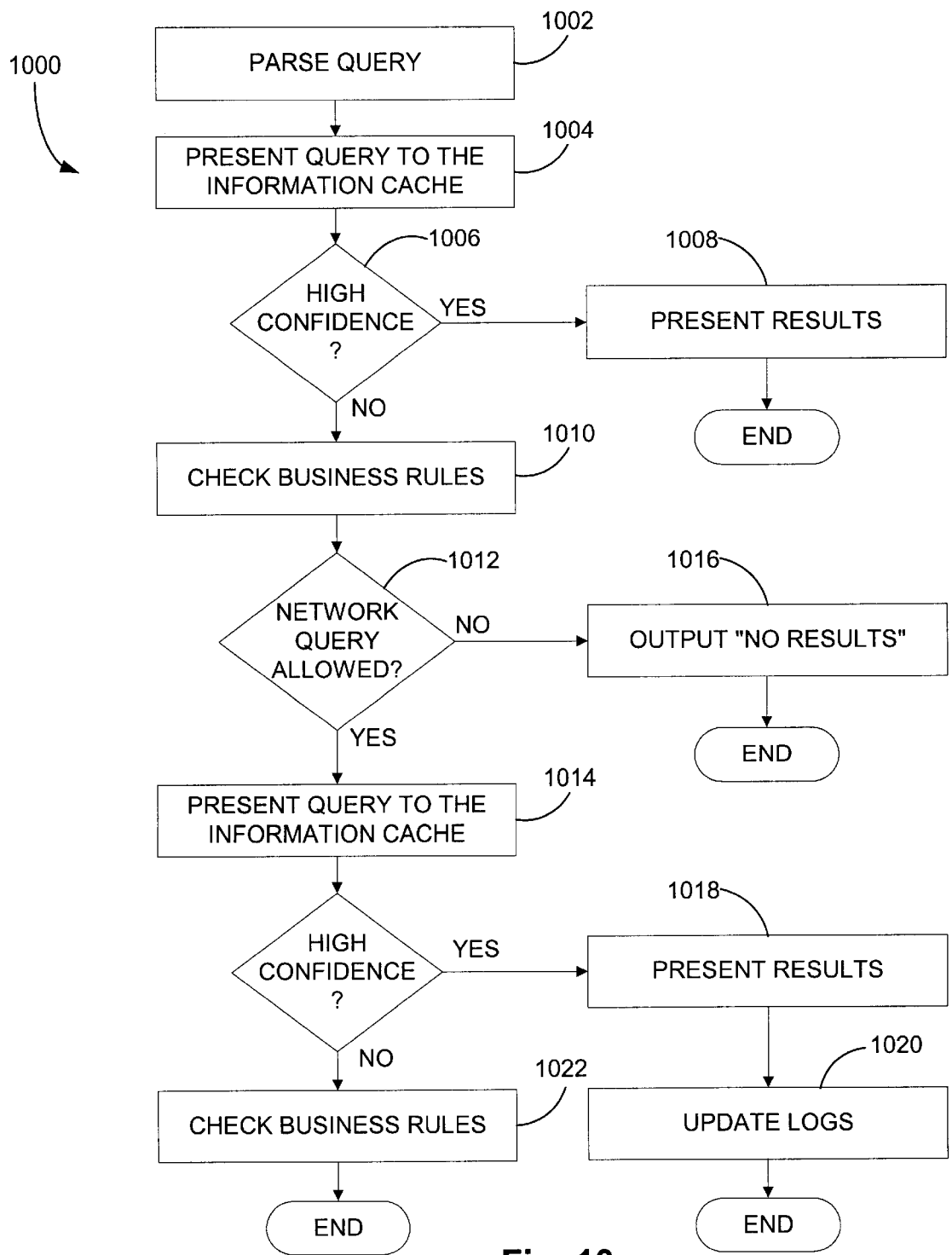
FIG. 10 is a flow diagram setting forth a general procedure that can be utilized to perform a query using a local topic determiner.

FIG. 10 is a flow diagram setting forth a general procedure 1000 that can be utilized to perform a query using the local topic determiner. In operation 1002, the query is parsed with local grammars. The parsed query is presented to the local Information Cache in operation 1004. At decision 1006, it is determined whether the local answer is "high confidence." If the local answer is "high confidence" (e.g. enough slots in the recognition template are filled) then the result(s) are presented to the user in operation 1008 and the process ends. Otherwise, continue on to operation 1010.

In operation 1010, the local business rules are checked to determine what action to take. At decision 1012, a determination is made as to whether the local business rules allow a network query. If so, in operation 1014 the English language query and parsed query are sent to the DDN(s) (note that there may be more than one DDN available to the site). If the local business rules do not allow a network query, a message indicating that no information is available is presented in operation 1016. If the DDN responds with a result, the result are presented to the user in operation 1018 and the appropriate logs are updated in operation 1020. If the DDN doesn't respond with a result, a message is presented in operation 1022 indicating that no information is available. It should be noted that the query can be in any language.

The table below sets forth the parameters of the content request message sent to the DDN (to be formatted as an XML DTD):

TABLE 7

Requesting Site
English Query
Parsed Query
Time stamp
Rule used
cookie

Local Rules

The local rules are executed in order of priority. Upon executing the first rule that is true, the rules are exited.

Example 5 sets forth sample code.

EXAMPLE 5

CASE
  CASE=RULE 1
  Always send queries to Site XXX
  CASE=RULE 2
  Send Queries to site A OR IF no result
  THEN site B OR IF no result
    THEN Site C
  CASE=RULE 3
  IF no result returned
THEN offer to anyone who wants to respond ranked by lowest price
  CASE=RULE 4
  IF no result returned
    THEN offer to anyone who responds ranked by highest confidence
  CASE=RULE 5
  IF no result returned
    THEN offer to anyone who wants to respond ranked by highest confidence with a maximum price of $X.XX
  CASE=RULE 6
  Send user to site willing to pay more than $x.xx
ENDCASE Network Topic Determiner 518

Several different methods are defined for determining which site has the content desired. Other methods may also be used. See the discussion above with reference to FIGS. 5–7 for more details.

Figure 11:
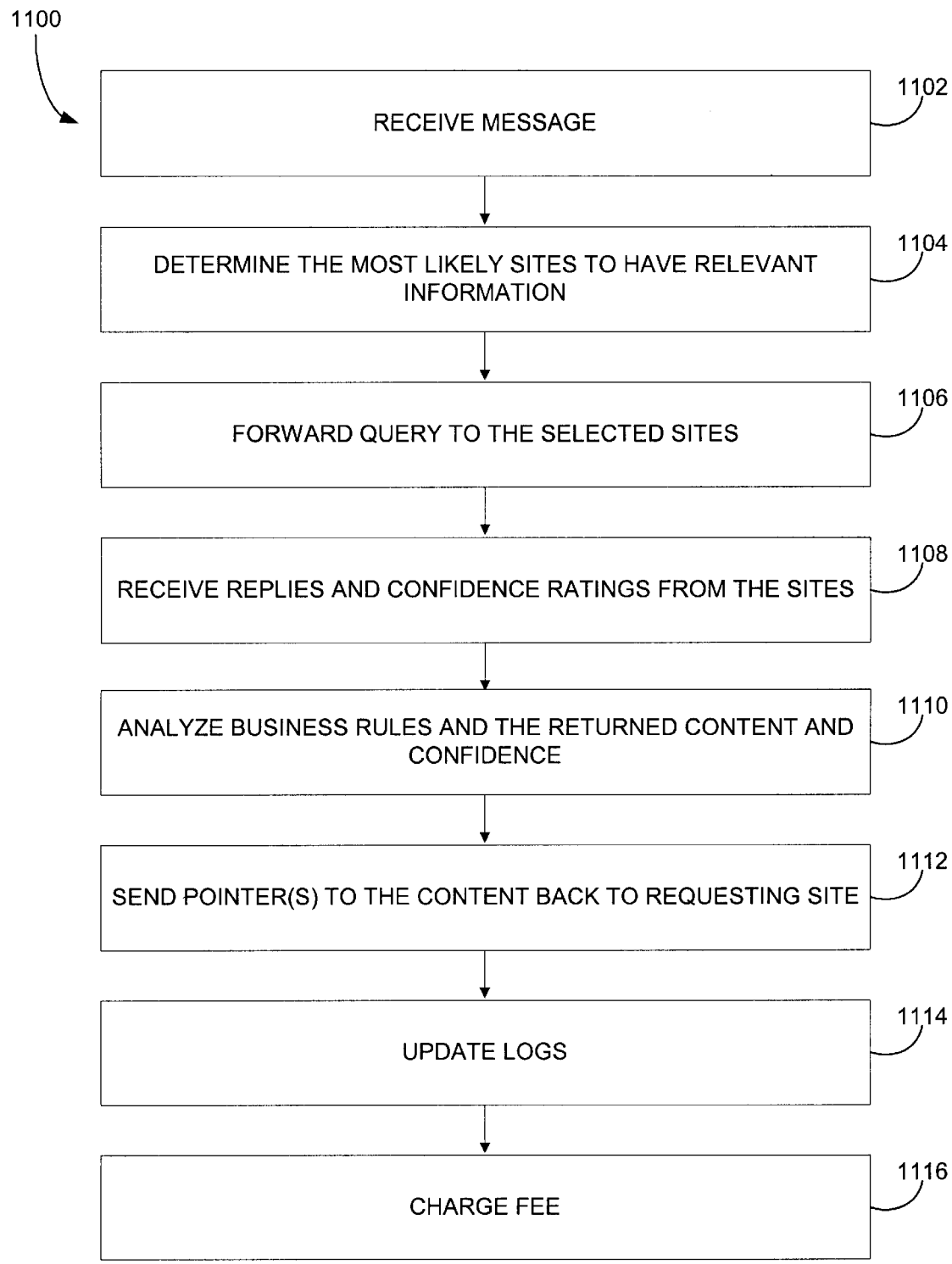
FIG. 11 is a flow diagram of a general procedure for finding a site with content utilizing a network topic determiner.

FIG. 11 is a flow diagram of a general procedure 1100 for finding a site with content utilizing the Network Topic Determiner (NTD). In operation 1102, the NTD receives the Content Request Message and, in operation 1104, determines the n most likely sites to have the relevant information (excluding any systems that only communicate with named systems of whom the requesting site is not one). In operation 1106, the NTD forwards the query from the Content Request Message to the n most likely sites. The best answers along with a confidence rating are received from the sites in operation 1108. In operation 1110, the NTD looks at the content, confidence and business rules in the Content Request Message and in the network content rules and, in operation 1112, sends a pointer to the content back to the requesting site. The appropriate logs are updated in operation 1114. A service fee is charged to the user who made the query in operation 1116.

The table below sets forth the parameters of the content offer message sent to the DDN (to be formatted as an XML DTD):

TABLE 8

Offering Site
English Response
Time stamp
Rule used
Confidence
Content class
Content price (if dynamic)

Network Rules

The network rules are executed in order of priority. Upon executing the first rule that is true, the rules are exited. See the following table.

TABLE 9

| Content Provider | Pointer to Rule 1 Code |

Example 6 sets forth sample code.

EXAMPLE 6

Figure 12:
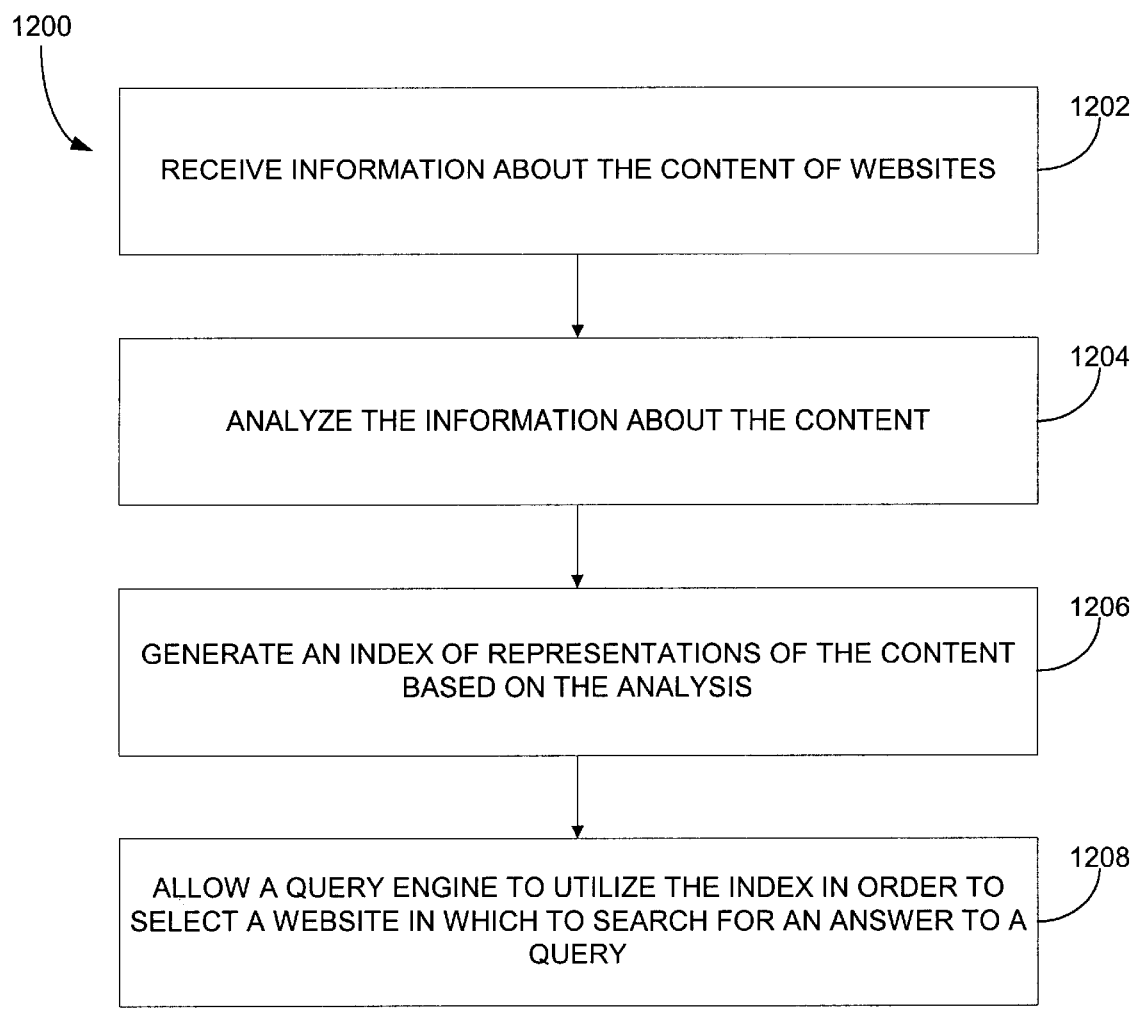
FIG. 12 depicts a process for creating a content directory.

CASE
  CASE=RULE 1
  Always provide content to Site XXX at negotiated rate
  CASE=RULE 2
  Always sell content of class "A" (where there may be multiple classes of content) for $x.xx if not a known site
  CASE=RULE 3
  Will pay $x.xx for you to send me your user
ENDCASE Content Directory FIG. 12 depicts a process 1200 for creating a content directory. Information about content of one ore more network data sites is received in operation 1202. In operation 1204, the information about the content is analyzed. An index of representations of the content is generated in operation 1206 based on the analysis. Note that the representations can be organized into groups and subgroups, and the same representations can be placed in more than one group. Preferably, the data in the index is organized hierarchically. In operation 1208, a query engine is allowed to utilize the index to select a network data site in which to search for information pertinent to a query.

In one embodiment of the present invention, a term frequency analysis is performed on the content of each of the network data sites and the term frequencies (i.e., word counts) are placed in the index. See Example 7 below. A weighted measure of relevance between a query and a site is generated. If a term is used only on one site, it is given heavier weight. The relevance of the query can be determined based on the frequency of terms in each of the items of content, as determined by the term frequency analysis. Preferably, each site is taken independently and a judgment is made as to how much a site knows about a particular topic based on how often various terms appear.

EXAMPLE 7

In this example, four sites are analyzed. The content of the four is downloaded in its entirety. For greater performance, only text can be downloaded. In this example,—ESPN, CNN, Entertainment Tonight and The Weather Channel— content overlaps when it is taken out of context. For example, the word "strike" will have a different meaning on the ESPN site (baseball) than on the CNN site (labor strike).

In another embodiment of the present invention, all of the network data sites' directories (indexes) are received from the network data site(s) and merged into a single weighted index. The text itself can be analyzed to determine its general context, thereby creating a concept index rather than a word count index.

In yet another embodiment of the present invention, the index is normalized based on the query. Here, the proper nouns and verbs are analyzed to determine a context of the question at a predetermined (or acceptable) level. It should be noted that more complex analysis of the question can be performed. For example, prepositional phrases, adverbial terms/phrases, etc. can be identified and analyzed.

The determined context is then used to normalize the site index(es). Information on the sites is parsed to determine which nouns and normalized verbs are resident there in order to determine the best manner in which to approach the query.

To normalize an input string such as sentence, for example the string is first morphologically analyzed, using the predefined record in the lexicon for each of its constituent words, to generate a so-called "stem" (or "base") form therefor. Stem forms are used in order to normalize differing word forms, e.g., verb tense and singular-plural noun variations, to a common morphological form for use by a parser. Once the stem forms are produced, the input string is syntactically analyzed by the parser, using the grammatical rules and attributes in the records of the constituent words, to yield the syntactic parse tree therefor. This tree depicts the structure of the input string, specifically each word or phrase, e.g. noun phrase, in the input string, a category of its corresponding grammatical function, and link(s) to each syntactically related word or phrase therein.

In another embodiment of the present invention, the analysis of the information about the content includes performing a linguistic analysis on the content of the at least one network data site for generating the index. Alternatively, the analysis of the information can include performing a statistical analysis of co-occurrence data, i.e., the matching of word and/or phrase patterns to a model word and/or phrase, to determine where to index a particular content item.

Preferably, locations of the content are determined and pointers to the content are generated and stored in the index. As an option, the index can be dynamically updated based on a trend of usage such as, for example, content items selected repeatedly by users for a particular query topic. The network data site can be an information cache which contains content previously retrieved from other network data sites. Further, a fee can be charged for utilizing the index.

During a query, a ranking analysis is performed to determine which site has the most relevant documents. Next, a relevancy analysis is performed on the selected documents. Relevance measures can include such things as whether the content is from a trusted source, authorship, a seal of approval, business rules, and link popularity. The query is also parsed to some level to determine its topic. The site with the most relevant documents is selected and the query and documents are matched. See also Example 8, below. Also note that the various embodiments of the present invention are not to be limited by the examples pertaining to retrieving documents, but rather can be utilized to find and retrieve any type of information.

Figure 13:
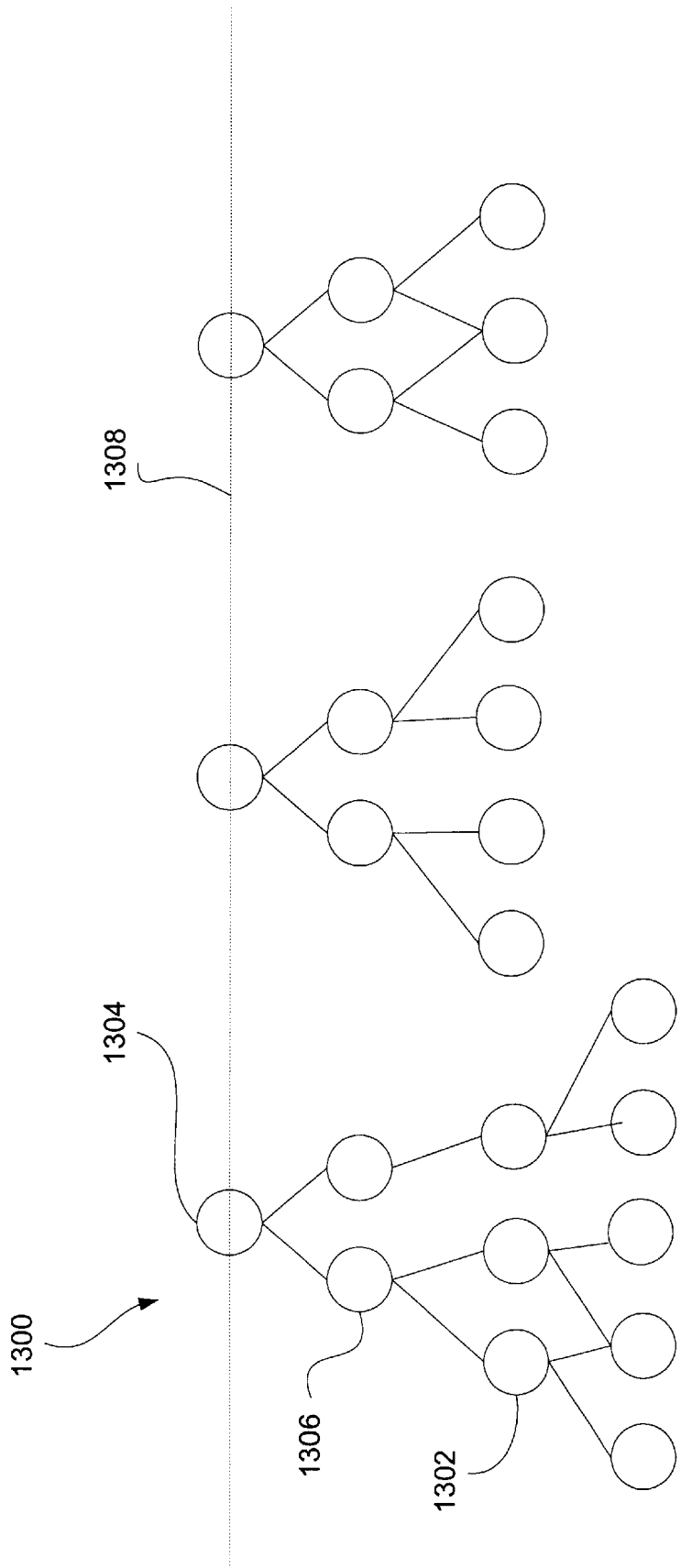
FIG. 13 depicts a data structure of an index according to an embodiment of the present invention.

FIG. 13 depicts a data structure 1300 of an index according to an embodiment of the present invention. As shown, content items 1302 are organized in groups under main topics or headings 1304. Some analysis of the content may have to be performed to determine what can be distributed to the content directory at the meta level. The main topics can be likened to desks of a news organization with, for example, a desk for sports, another desk for business news, and a desk for weather. Under each main topic are subtopics 1306 each having an associated subdirectory of content and further subdirectories. For example, under the "sports desk," sports would be divided into Football, Basketball, Soccer, Swimming, etc.. Alternatively, an existing structure can be scraped to obtain a directory of categories.

As an option, the index can be organized in accordance with the Open Directory Project (ODP) standard for directories.

When performing a query, some high level of the data structure is chosen and enough analysis to get into that level is performed. The dashed line 1308 of FIG. 13 shows an illustrative threshold level for entering the data structure of the content directory. Then the analysis is pushed down into the branches of the structure.

EXAMPLE 8

Continuing with the desk example, an illustrative query asks "Who did AOL acquire?" "AOL" is recognized as a proper name, but is it a person, place, thing, organization? "Acquire" is recognized as a verb, but it is not yet determined if it is AOL acquiring something or being acquired.

Just enough analysis to get to the proper desk, i.e., the desk that most likely holds the answer, should be performed on the index entries. Upon performing the partial analysis, it is determined that the query most likely corresponds to the business desk. Since AOL could also be a name of a sports team, the query is also routed to the sports desk with a low priority and the business desk with a high priority.

Restrictions can also be used to select the proper desk. For example, if it is suspected that "acquire" is a word associated with companies, that word can be used to limit the query. For example, the query could be set to block out names of people, because companies do not acquire people.

On the query side, the search can be treated as a bag of words. The sequence of words and the linguistic relationship in the query is not taken into account. Rather the query is read "AOL acquired." The general desk is determined based on this simplified query, though it is not know that it is AOL doing the acquiring vs. who acquired AOL.

Retrieving Event Information from Basic Syntactic Information

In one embodiment of the present invention, the following are indexed:

events as described by linguists. An event has a type and event participants. Participants can be agents, objects, time, and location (probably some other thematic types as well).

company names
people names
other items

When a query is performed, a resulting event template is generated or retrieved and it is used to match against information held in the information cache (content directory).

In addition to capturing information through a focused combiner-grammar method, the present invention can also take advantage of the syntactic information that would otherwise be set aside by doing the following:

1. index all information that "could" lead to identification of an event and its participants:
   a. all nominalized events
      i. all possible major participants in nominalized events, such as:
         (a). those coming from pre-nominal positions
         (b). those coming from predominantly noun-modifying prepositional phrases (e.g., those headed by "of")
         (c). those from other prepositional phrases that statistically align with certain nominalized events (this bit requires some investigation because we might not be able to limit nominals and prepositional phrases in a useful way.
   b. all main sentence head verbs
      i. all possible major participants such as:
         (a). all syntactic argument positions for verbs
         (b). those event participants from prepositional phrases that statistically align with certain verbs.
   c. all the information that is sometimes collected from relative clauses (the linguists can help describe this one).
2. assign a unique label/D to each syntactic contributor type above
3. for every verb and noun that contributes to an event what is needed to be known is:
   a. the syntactic structures in which they are found. Each word-syntactic-structure combination (e.g., agree+sentence-verb-head) is indexed.
   b. each syntactic structure in which the noun or verb is found has accompanying "offset" information. For each word-syntactic-structure, the sentence in which it is found is recorded as well as its sentence position (e.g. first, second, etc. position in the sentence) in which the word occurs.
   c. the documents in which the syntactic structures occur.

To help with retrieval, the present invention can supplement the information above by doing the following:

1. organize the current collection of "combinators" and establish how to universally organize other combinators that may be used in the future. For instance a combinator that uses a pre-nominal modifier and nominalized event would be given its own ID (putting aside for the moment the particular verb that may have been used in one of the current combinator rules).
2. better recall performance can be achieved by grouping verbs and their respective nominalized forms (e.g., the verb "agree" with its nominalized form "agreement").
3. better recall performance is also achieved by identifying other event combinators that may point to the same event type.
4. the more known verb-specific information, the better. For instance, knowing that a verb like "agree" often has one of its arguments located in an accompanying prepositional phrase headed by "with" is very valuable information.
5. better recall performance can be achieved by grouping verbs by semantic types.
6. better recall performance can be achieved by grouping nouns by semantic types.

During retrieval, the following can be performed:

1. parse the query
2. first, use the information that is currently captured in combinators and domain-specific rules. If through the parse, a match is found through default methods, then use that information and retrieve information by the default method.
3. if a match is not found through the default methods, the following occurs:
   a. use information from the parse of a query which will include:
      i. the syntactic element types that potentially identify head verbs and event participants. These elements are labeled by an ID as mentioned above. The general phrase "syntactic element types" is used here because the combinators may use a combination of syntactic constituents and sub-constituents.
      ii. various combinator rules that could be used to combine head verbs and event participants.
      iii. the particular verbs and nouns that appear in the query
   b. each query has the potential for multiple interpretations because multiple combinator rules might be applicable to the available syntactic elements in a query. For each interpretation, the respective contributing syntactic elements are recorded, including the words in the syntactic elements.
   c. for each interpretation, the available information is taken and used to submit a two-part query.
      i. the first part has the word information (from the potentially contributing verbs and nouns) and the syntactic structures in which they appear (e.g., a noun-noun combination).
         (a). from the word and respective syntactic structures, an identification is made of those sentences (or perhaps paragraphs) which have occurrences of the words from the query and their respective syntactic information.
         (b). results in the first can be ranked by:
            (i). giving more value to those sentences which have the more occurrences of the relevant words and respective syntactic structures from the query.
            (ii). giving more value to those sentences in which the words and respective syntactic structures are more adjacent to one another.
      ii. try to apply the combinator(s) used in the query to the results returned from the first part of the query.
         (a). rank results by way of the "best" fit. "Best" fit will be determined by:
            (i). the number of event elements filled.
            (ii). closeness to the rules derived as important for the interpretation of an event found in the user's query.
   d. the queries above can be expanded by using any available information regarding:
      i. other syntactic combinations in which the event may be found, such as:
         (a). sister nominalized or verb-headed event forms.
         (b). other words that have similar meanings to those found in the query.
         (c). other event combinators that are known to possibly identify events similar to that in a query.

ii. there is the potential to give results that match "expansions" to a query less value than those found through the direct matching methods described above.

e. for each "interpretation" of the query, the interpretation can be paraphrased and given back to the user. The user can select the preferred interpretation. Then the respective results can be returned.

Dynamically Updating the Cache with Event Information

The approach above can also be used for improved "dynamic" updating of the information cache. In a simple embodiment of the present invention, when new event combinators are created, documents are re-parsed and then re-indexed. To improve updating of the cache, the basic syntactic information is retained. This allows the preset invention to go into the information cache, target the syntactic structures and words of interest—namely those that fit with new event combinators, create new event structures from the "old" syntactic information, and index the new event information.

Also when perfect matches are not found for those events found in user queries, as described above, there is the potential for the present invention to return multiple interpretations from which the user picks one. The present invention can also use the alignment of the query and the user-feedback regarding the correct interpretation of the query to update the information cache. An event type can be assigned to that information that corresponds with the interpretation selected by the user.

Business Processes

According to an embodiment of the present invention, a fee may be charged for access to content, presentation of content, etc. As such, a call detail record is maintained. The call detail record stores information about the requesting site, all sites that information was obtained or searched from, etc. Information on licensing relationships between sites on the web is applied to the information in the call detail record to determine the fee for accessing the content. Many different types of pricing schemes may be used, such as, for example, pricing a document based on its relevancy to the query. If multiple content items are found at a site and/or at various sites, such multi-document, multi-source information can be charged for individually.

In an additional method to generate revenue, the viewer can be driven to one or more sites so that a fee can be collected for information retrieved from each of these sites. The content can be delivered to the viewer or the viewer can be directed to the content.

Output results

When performing the search, multiple answers are likely to be found. The results may be weighted and presented to the users ordered by weight. Illustrative weighting processes have been set forth above. The relevance of a particular content item can be set forth in terms of a percentage. Another output structure is tabular output of data items or categories. Graphical presentation of outputs can also be created, such as a Java 3D presentation using color coding to illustrate the weights of the various results.

Summaries of the results can be presented, each with a pointer to the full content item. Such summaries may include a cite or link to the content, a brief summary of the content, a full summary of the content, etc.

When generating summaries, structured records can be are pulled up from the content directory or actual site, rather than the text. For example, structured data from the cache can be used to produce human readable text from the information. Thus, a natural language summary can be created from the cache.

It should be noted that if the structures are identical, there may not be a need to report the redundant text.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a content exchange system, comprising the steps of:
   (a) receiving a natural language request from a user utilizing a local system;
   (b) determining whether the user request can be fulfilled from information stored by the local system;
   (c) fulfilling the request from a local data source if the request can be fulfilled locally; and
   (d) attempting to fulfill the request at a network site if the request cannot be fulfilled locally, further comprising the steps of:
      (i) examining a content directory for selecting at least one network data site having content potentially satisfying the request;
      (ii) sending the request to the at least one data site;
      (iii) receiving content pertaining to the request from the at least one data site; and
      (iv) sending information about the content to the user.

2. A method as recited in claim 1, further comprising the step of logging details of steps (a)–(d) for collecting a fee.

3. A method as recited in claim 1, wherein the network site determines whether the user request can be fulfilled from information stored by the local system.

4. A method as recited in claim 1, wherein the local system sends content for fulfilling the request to the network site.

5. A method as recited in claim 1, wherein the content directory includes term frequency data, wherein the request is compared to the term frequency data for selecting the at least one data site.

6. A method as recited in claim 1, wherein items of the content are ranked according to relevance to the request.

7. A method as recited in claim 1, further comprising the step of receiving clarification information from the user.

8. A method as recited in claim 1, further comprising the step of pushing additional content to the user selected based on user activity.

9. A method as recited in claim 1, wherein a cookie is generated.

10. A method as recited in claim 1, wherein the content for fulfilling the request is filtered based on a transaction history of the user.

11. A computer program product for providing a content exchange system, comprising:
   (a) a code segment for receiving a natural language request from a user utilizing a local system;
   (b) a code segment for determining whether the user request can be fulfilled from information stored by the local system;
   (c) a code segment for fulfilling the request from a local data source if the request can be fulfilled locally; and
   (d) a code segment for attempting to fulfill the request at a network site if the request cannot be fulfilled locally, further comprising:
      (i) a code segment for examining a content directory for selecting at least one network data site having content potentially satisfying the request;

(ii) a code segment for sending the request to the at least one data site;

(iii) a code segment for receiving content pertaining to the request from the at least one data site; and (iv) a code segment for sending information about the content to the user.

12. The computer program product as recited in claim 11, further comprising a code
segment for logging transaction details for collecting a fee.

13. The computer program product as recited in claim 11, wherein the network site determines whether the user request can be fulfilled from information stored by the local system.

14. The computer program product as recited in claim 11, wherein the local system sends content for fulfilling the request to the network site.

15. The computer program product as recited in claim 11, wherein the content directory includes term frequency data, wherein the request is compared to the term frequency data for selecting the at least one data site.

16. The computer program product as recited in claim 11, wherein items of the content are ranked according to relevance to the request.

17. The computer program product as recited in claim 11, further comprising a code segment for receiving clarification information from the user.

18. The computer program product as recited in claim 11, further comprising a code segment for pushing additional content to the user selected based on user activity.

19. The computer program product as recited in claim 11, wherein a cookie is generated.

20. The computer program product as recited in claim 11, wherein the content for fulfilling the request is filtered based on a transaction history of the user.

21. A system for providing a content exchange system, comprising:

(a) a local system, wherein a natural language request from a user is received;

(b) logic for determining whether the user request can be fulfilled from information stored by the local system;

(c) logic for fulfilling the request from a local data source if the request can be fulfilled locally; and (d) logic for attempting to fulfill the request at a network site if the request cannot be fulfilled locally, including:

(i) logic for examining a content directory for selecting at least one network data site having content potentially satisfying the request;

(ii) logic for sending the request to the at least one data site;

(iii) logic for receiving content pertaining to the request from the at least one data site; and (iv) logic for sending information about the content to the user.

* * * * *

UNITED STATES PATENT AND TRADEMARK OFFICE
CERTIFICATE OF CORRECTION

PATENT NO. : 6,735,592 B1
DATED : May 11, 2004
INVENTOR(S) : Seth Neumann, Steve Obsitnik and Greg Whittemore It is certified that error appears in the above-identified patent and that said Letters Patent is hereby corrected as shown below:

Column 4,
Line 57, please begin a new paragraph after "be provided." Beginning with -- OOP is a process --

Column 9,
Line 55, please change "(UD)" to -- (UI) --.

Column 28,
Lines 24 and 67, please change "request;" to -- request, wherein the request is parsed for determining a meaning of the request, wherein the determined meaning issued during examination of the content directory; --.

Column 30,
Line 21, please change "request;" to -- request, wherein the request for determining a meaning of the request, wherein the determined meaning is used during examination of the content directory; --

Signed and Sealed this

Seventh Day of December, 2004

JON W. DUDAS
*Director of the United States Patent and Trademark Office*